(12) United States Patent
Nakano et al.

(10) Patent No.: US 7,896,556 B2
(45) Date of Patent: Mar. 1, 2011

(54) NEEDLE ROLLER BEARING

(75) Inventors: Yoshiyasu Nakano, Kikugawa (JP);
Shinji Oishi, Iwata (JP); Katsufumi Abe, Iwata (JP); Akihiko Katayama, Kikugawa (JP); Yugo Yoshimura, Iwata (JP); Noriaki Fujii, Wako (JP); Keiko Yoshida, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 11/886,049

(22) PCT Filed: Mar. 13, 2006

(86) PCT No.: PCT/JP2006/304908

§ 371 (c)(1),
(2), (4) Date: Sep. 11, 2007

(87) PCT Pub. No.: WO2006/098277

PCT Pub. Date: Sep. 21, 2006

(65) Prior Publication Data

US 2008/0131041 A1 Jun. 5, 2008

(30) Foreign Application Priority Data

Mar. 14, 2005 (JP) .............................. 2005-070383
Jun. 10, 2005 (JP) .............................. 2005-170995
Jul. 29, 2005 (JP) .............................. 2005-219996

(51) Int. Cl.
*F16C 33/58* (2006.01)
*F16C 35/00* (2006.01)
*F16C 19/00* (2006.01)

(52) U.S. Cl. ..................... 384/570; 384/429; 384/474

(58) Field of Classification Search ................. 384/456, 384/457, 462, 554, 564, 569, 570, 574, 575, 384/584, 585; 74/595
See application file for complete search history.

(56) References Cited

U.S. PATENT DOCUMENTS

| 1,500,902 | A | * | 7/1924 | Sewell ......................... 384/570 |
| 1,821,873 | A |   | 9/1931 | Best |
| 1,921,488 | A |   | 8/1933 | Smith |
| 2,289,233 | A |   | 7/1942 | Beall et al. |
| 3,244,463 | A | * | 4/1966 | Bowen, III et al. .......... 384/127 |
| 3,883,194 | A |   | 5/1975 | Pitner |

(Continued)

FOREIGN PATENT DOCUMENTS

CN 2338536 9/1999

(Continued)

*Primary Examiner*—Thomas R Hannon
*Assistant Examiner*—Phillip A Johnson
(74) *Attorney, Agent, or Firm*—Clark & Brody

(57) ABSTRACT

A needle roller bearing comprises an outer ring having a plurality of outer ring members split by split lines extending in an axial direction of the bearing, a plurality of needle rollers arranged on an orbit surface of said outer ring so that they can roll thereon, and a cage holding the needle rollers at intervals. The outer ring member has a projection serving as a positioning engaging part which engages with a housing for positioning, and an engaging click protruding from an axial end of the outer ring member inward along a diameter to prevent the cage from moving in an axial direction, in positions shifted from its circumferential center.

9 Claims, 10 Drawing Sheets

U.S. PATENT DOCUMENTS 4,856,366 A 8/1989 Nikolaus
6,676,294 B2 * 1/2004 Harimoto et al. ............... 384/2

FOREIGN PATENT DOCUMENTS

| | | |
|---|---|---|
| EP | 0 623 194 | 12/1995 |
| JP | 49-057239 | 6/1974 |
| JP | 4-087020 | 7/1992 |
| JP | 04-357325 | 12/1992 |
| JP | 7-506889 | 7/1995 |
| JP | 10-237620 | 9/1998 |
| JP | 2002-525533 | 8/2002 |

* cited by examiner

NEEDLE ROLLER BEARING

TECHNICAL FIELD

The present invention relates to a needle roller bearing which supports a crankshaft, a camshaft, a balance shaft, a rocker shaft and the like for a car engine.

BACKGROUND ART

Conventionally, as a device for supporting a crankshaft 1 of a car shown in FIG. 1 and the like, a split type roller bearing is used in general. Since the roller bearing has high load capacity, it is suitable for a bearing used under high load circumstances.

However, as a fuel-efficient car is increasingly demanded in view of environment, a needle roller bearing is used instead of the roller bearing recently in some cases. As compared with the roller bearing, although the needle roller bearing is low in load capacity, since its friction resistance is low at the time of rotating, its rotation torque or a feeding amount to a supporting part can be reduced.

However, a needle roller bearing to support a crank pin 2 of the crankshaft 1 cannot be press-fitted in the axial direction. Therefore, a needle roller bearing to be used in such place is disclosed in U.S. Pat. No. 1,921,488, for example. According to this document, as shown in FIG. 2, since a needle roller bearing 3 comprises an outer ring having outer ring members 4a and 4b split by split lines extending in an axial direction of the bearing, it can be set in the crank pin 2.

In addition, as shown in FIG. 3, Japanese National Publication No. 2002-525533 of International Application discloses a needle roller bearing 6 which comprises an outer ring 7, a plurality of needle rollers 8 arranged on an orbit surface of the outer ring 7 so that they can roll thereon, and a cage 9 holding the needle rollers 8 at intervals. When the needle roller bearing 6 supports a shaft, the cage 9 is prevented from being shifted in an axial direction by reducing an axial diameter at both ends of the bearing of the shaft 5 so that the cage 9 protrudes inward along a diameter.

Since load is deflected to a predetermined direction in the crankshaft 1 shown in FIG. 1 and the like during rotation, the outer ring of the bearing comprises a region in which the load is concentrated (referred to as the "load region" hereinafter), and a region in which great load is not applied (referred to as the "non-load region" hereinafter). Thus, when the outer ring of the needle roller bearing 3 shown in FIG. 2 is set in the shaft, a boundary 4c of the outer ring members 4a and 4b is to be positioned in the non-load region.

However, since the outer ring members 4a and 4b are only fixed by being fit in a housing, when the roller bearing 3 receives load during the rotation, the outer ring members 4a and 4b could be rotated and displaced in the housing. At this time, when the boundary 4c of the outer ring members 4a and 4b is moved to the load region, a rotation defect of the needle roller could be caused or the outer ring members 4a and 4b could be damaged and the like.

In addition, according to the needle roller bearing 6 shown in FIG. 3 and the like, since a process for the shaft 5 to prevent the cage 9 from being shifted in the axial direction is needed, its processing cost is increased.

DISCLOSURE OF THE INVENTION

It is an object of the present invention to provide a needle roller bearing which can prevent an outer ring from rotating in a housing.

It is another object of the present invention to provide a needle roller bearing comprising means for preventing a cage from moving in an axial direction without performing any process for a peripheral structure in order to prevent the cage from being shifted in an axial direction.

It is still another object of the present invention to provide a needle roller bearing which can prevent an outer ring from rotating in a housing even when it is used under high-load circumstances.

According to one aspect, a needle roller bearing in the present invention comprises an outer ring having a plurality of outer ring members split by split lines extending in an axial direction of the bearing, and a plurality of needle rollers arranged along an inner diameter surface of the outer ring so that they can roll thereon. The outer ring member has a positioning engaging part which engages with a housing for positioning at a position shifted from its circumferential center.

According to the above constitution, since the positioning engaging part is provided in the outer ring member, the outer ring can be prevented from rotating in the circumferential direction. Thus, since the boundary of the outer ring members is not moved to the load region, a rotation defect of the needle roller is prevented and the outer ring member is not damaged and the like.

Preferably, the outer ring member has a middle region positioned in its circumferential center to be a load region while the bearing is used, and end regions positioned its circumferential ends to be non-load regions while the bearing is used, and the positioning engaging part is positioned in the end region.

For example, when the positioning engaging part is formed from the side of an inner diameter surface of the outer ring member by a burring process, the recessed part is formed in its orbit surface and the surface is not flat. When the recessed part is provided in the load region, a trouble such as a rotation defect of the needle roller could be caused when the roller passes on the recessed part. Thus, the engaging part is to be provided in the end region which is the non-load region to avoid such trouble.

Preferably, the needle roller bearing further comprises a cage holding the plurality of needle rollers at intervals, in which the outer ring member has an engaging click protruding inward along a diameter at its width-direction end to prevent the cage from moving in an axial direction. In addition, the engaging click is preferably positioned in the end region.

According to such constitution, the movement of the cage in the axial direction can be prevented without processing a peripheral structure of a shaft and the like. Furthermore, since the engaging click is provided in the end region of the outer ring member, a trouble such as the rotation defect or a damage due to contact between the cage and the engaging click can be prevented.

Preferably, the outer ring comprises two outer ring members and when it is assumed that a center angle is $\phi$ from an outermost end of the outer ring member in the circumferential direction, the end region 12e is positioned within a range of $5° \leq \phi \leq 45°$.

Since it is necessary to provide a continuous load region as large as possible in the car crankshaft and the like, the center angle of the end region of the non-load region has to be set within 45° from the outermost end of the outer ring member. Meanwhile, when each of the positioning engaging part and the engaging click positioned in the end region is too close to the circumferential outermost end of the outer ring member, they are affected by curving stress when the outer ring member is curved, so that the center angle of them is to be 5° or more from the circumferential outermost end toward the middle region.

Preferably, the positioning engaging part and the engaging click are positioned in the end regions opposed across the middle region. Thus, the positioning engaging part, the engaging click and the outer ring member can be easily processed, respectively.

According to the needle roller bearing of the present invention, since the positioning engaging part for positioning the outer ring in the circumferential direction is provided, the needle roller bearing can prevent the outer ring from rotating in the circumferential direction when the bearing is used. In addition, with the engaging click, the needle roller bearing can prevent the cage from being shifted in the axial direction without processing a peripheral structure.

Furthermore, the needle roller bearing can prevent a trouble such as a rotation defect or a damage by arranging the positioning engaging part and the engaging click in the non-load region when the bearing is used.

According to another aspect, a needle roller bearing in the present invention comprises an outer ring having a plurality of outer ring members split by split lines extending in an axial direction of the bearing, a plurality of needle rollers arranged on an orbit surface of the outer ring so that they can roll thereon, and a positioning engaging part having a hole provided in the outer ring member, in which a diameter d of the hole and an effective length of the needle roller has a relation such that $d/t<0.5$.

According to the above constitution, since the positioning engaging part is provided in the outer ring member, the outer ring can be prevented from rotating in the circumferential direction. Thus, since the boundary of the outer ring member is not moved to the load region, a trouble such as the rotation defect of the needle roller or a damage of the outer ring member can be avoided.

At this time, when the hole provided in the positioning engaging part is too large, the movement of the needle roller on the hole becomes unstable, causing vibration and noise, and causing a damage of the needle roller bearing in an early stage. Thus, the relation between the diameter "d" of the hole and the effective length "t" of the needle roller is set such that $d/t<0.5$. As a result, since 50% or more of the effective length of the needle roller is in contact with the orbit surface of the outer ring even on the hole, the movement of the needle roller becomes stable and the above problem can be solved.

In addition, the "effective length of the needle roller" in this specification means a length of the needle roller except for chamfered parts on both ends thereof and a length of a part which is in contact with the orbit surface of the outer ring member.

Furthermore, it is preferable that the diameter "d" of the hole and an inner diameter "D" of the outer ring member has a relation such that $d/D<0.2$. Thus, since the movement of the needle roller can become further stable, vibration or noise can be effectively prevented and the bearing life can be elongated.

Preferably, the hole is arranged so that an end of the needle roller does not pass thereon. Even when the diameter of the hole is reduced, when the end of the needle roller passes on the hole, its movement is likely to become unstable. Thus, since the hole is arranged so that the end of the needle roller does not pass thereon even when the needle roller moves in the bearing axially, the movement of the needle roller can be stabilized.

According to the present invention, since the positioning engaging part having the hole having the appropriate size is provided, the needle roller bearing can prevent the outer ring from rotating in the circumferential direction and maintain smooth rotation of the needle roller when the bearing is used.

According to still another aspect, a needle roller bearing in the present invention comprises an outer ring having a plurality of outer ring members split by split lines extending in an axial direction of the bearing, a plurality of needle rollers arranged on an orbit surface of the outer ring so that they can roll thereon, and a positioning engaging part protruding toward an outer diameter surface of the outer ring member and having a top wall.

According to the above constitution, since the positioning projection is provided in the outer ring member, the outer ring can be prevented from rotating in the circumferential direction. Thus, since the boundary of the outer ring member is not moved to the load region, a trouble such as the rotation defect of the needle roller or a damage of the outer ring member can be avoided.

Since the needle roller bearing having the above constitution is used under high-load circumstances in many cases, great hardness is required for the positioning projection also. Thus, since a top wall is provided at the end of the positioning projection to enhance its hardness, the positioning projection can be prevented from being damaged.

Preferably, the top wall has an oil hole. Thus, since the lubrication oil can be effectively supplied to the rolling surface of the needle roller, the needle roller bearing can provide excellent lubricating ability.

According to still another aspect, a needle roller bearing in the present invention comprises an outer ring having a plurality of outer ring members split by split lines extending in an axial direction of the bearing, a plurality of needle rollers arranged on an orbit surface of the outer ring so that they can roll thereon, and a positioning projection protruding toward an outer diameter surface of the outer ring. The positioning projection has a configuration in which hardness in one direction to which the load is applied is higher than that in the other direction when the bearing is used. As a concrete example of the above, the positioning projection has an oval section in which it is long in the circumferential direction of the outer ring member.

Load is applied to the positioning projection of the above constitution in the circumferential direction of the outer ring member. Thus, when the positioning projection has an oval section in which it is long in the direction to which the load is applied, the hardness of the positioning projection can be enhanced.

According to the present invention, since the positioning projection has high hardness, the needle roller bearing can prevent the outer ring from rotating in the circumferential direction when the bearing is used even under high-load circumstances.

BEST MODE FOR CARRYING OUT THE INVENTION

Figure 1:
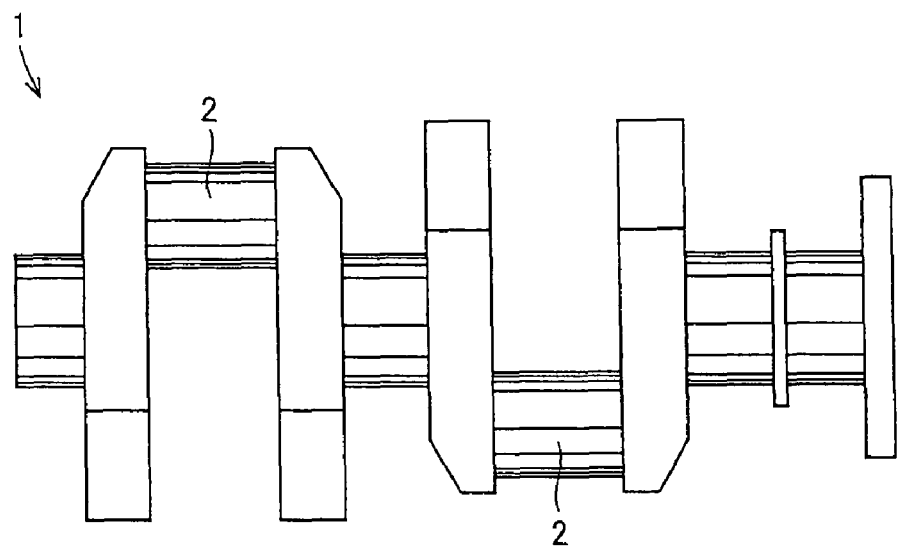
FIG. 1 is a view showing a crankshaft of a car.
Figure 2:
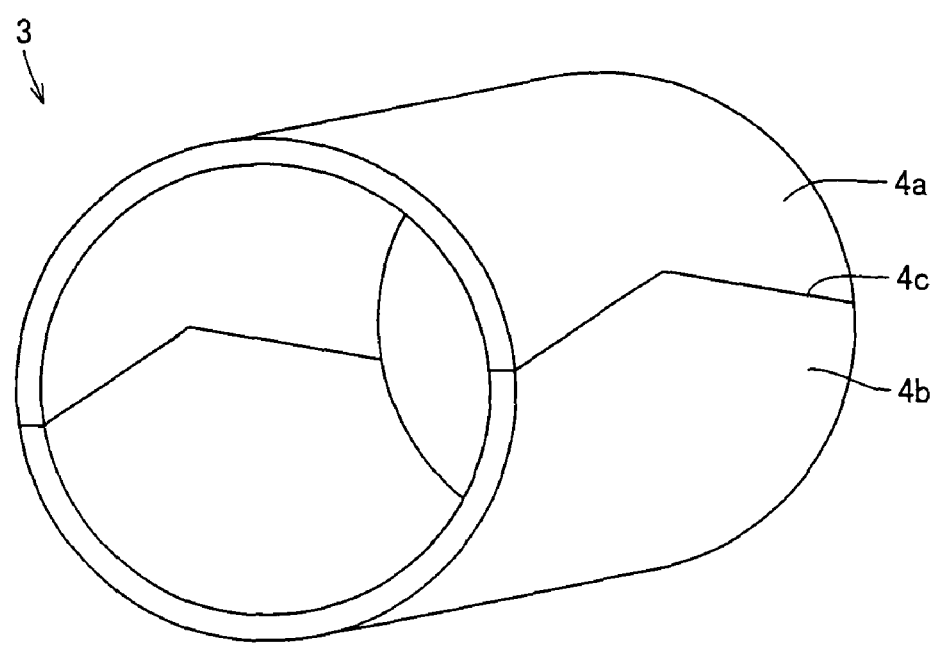
FIG. 2 is a schematic view showing a conventional needle roller bearing comprising an outer ring which can be split in a diameter direction.
Figure 3:
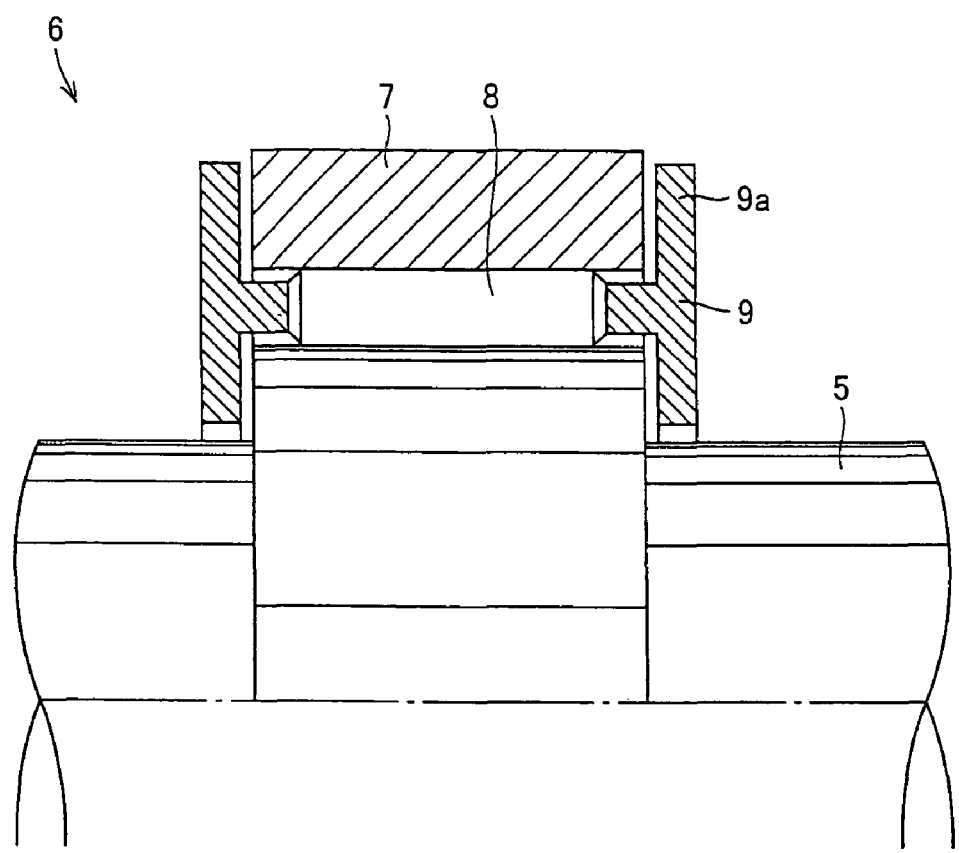
FIG. 3 is a view showing a conventional needle roller bearing comprising means for preventing movement of a cage in an axial direction.
Figure 4A:
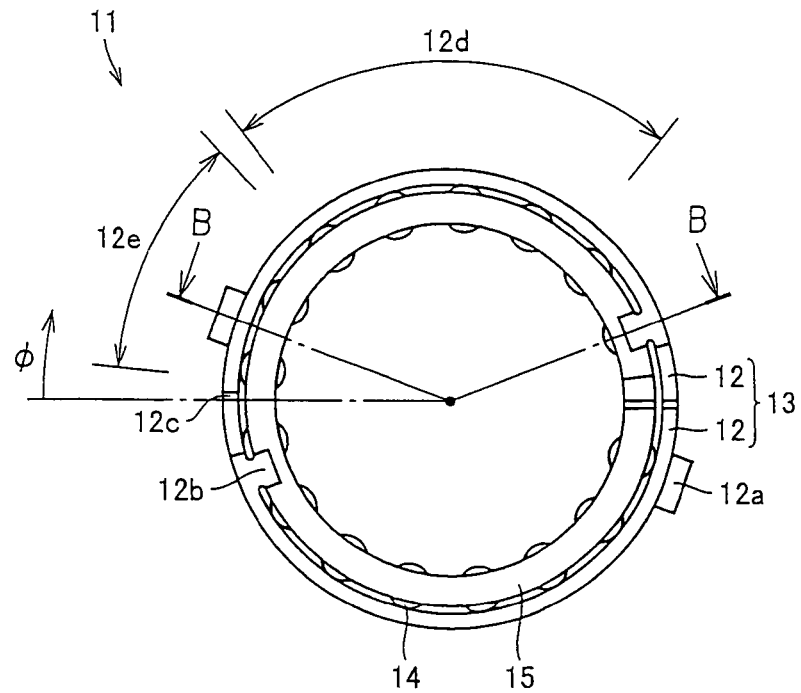
FIG. 4A is a front view showing a needle roller bearing according to one embodiment of the present invention.
Figure 4B:
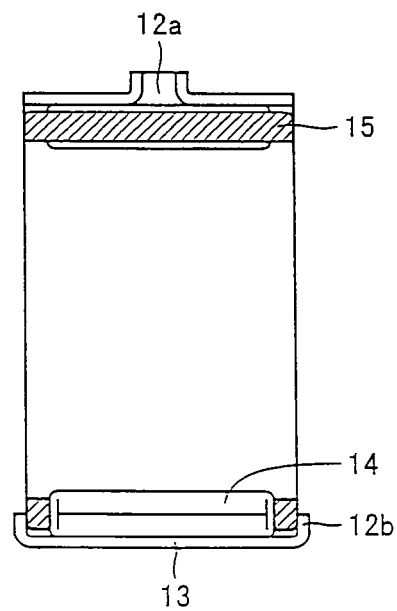
FIG. 4B is a sectional view taken along line B-B in FIG. 4A.

A needle roller bearing 11 according to one embodiment of the present invention will be described with reference to FIGS. 4A to 6C hereinafter. As shown in FIGS. 4A and 4B, the needle roller bearing 11 comprises an outer ring 13 having two outer ring members 12 split by split lines extending in an axial direction of the bearing, a plurality of needle rollers 14 arranged on an orbit surface of the outer ring 13 such that they can roll thereon, and a cage 15 holding the needle rollers 14 at intervals.

Figure 5A:
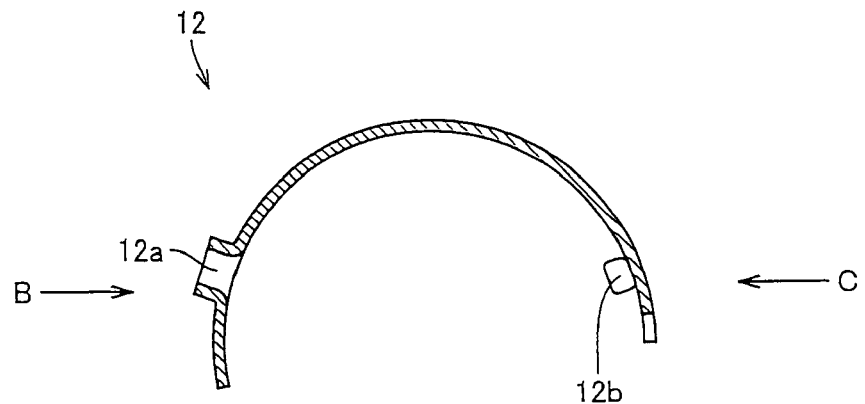
FIG. 5A is a view showing an outer ring member in the needle roller bearing according to one embodiment of the present invention.

As shown in FIG. 5A, the outer ring member 12 comprises a projection 12a serving as a positioning engaging part to engage with a housing for positioning, and the engaging click 12b protruding from a width-direction end thereof toward the inner diameter side to prevent the cage 15 from moving in the axial direction, in positions shifted from its circumferential center.

Figure 5B:
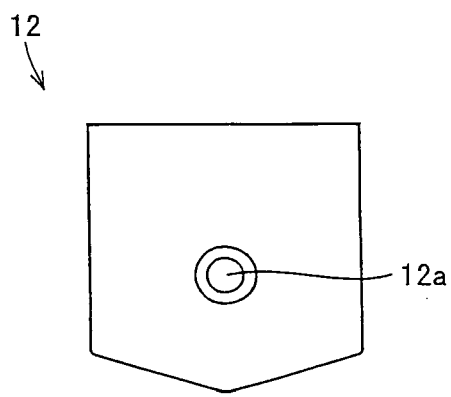
FIG. 5B is a view showing the outer ring member taken in a direction of arrow B in FIG. 5A.
Figure 5C:
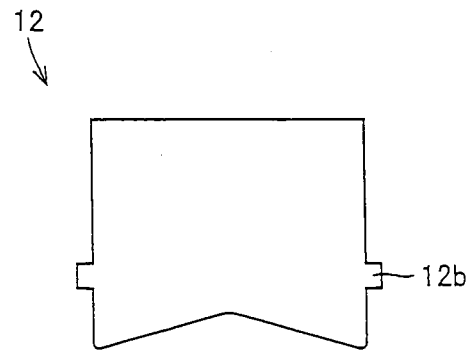
FIG. 5C is a view showing the outer ring member taken in a direction of arrow C in FIG. 5A.

As shown in FIGS. 5B and 5C, one circumferential end of the outer ring member 12 is in the form of V shape and the other circumferential end thereof is in the form of inverted V shape. The cylindrical outer ring 13 is formed by connecting the V-shaped end to the inverted V-shaped end of the two outer ring members 12. Here, as long as the split line can split the outer ring 13 in a diameter direction, it may not strictly coincide with the axial direction.

Figure 6A:
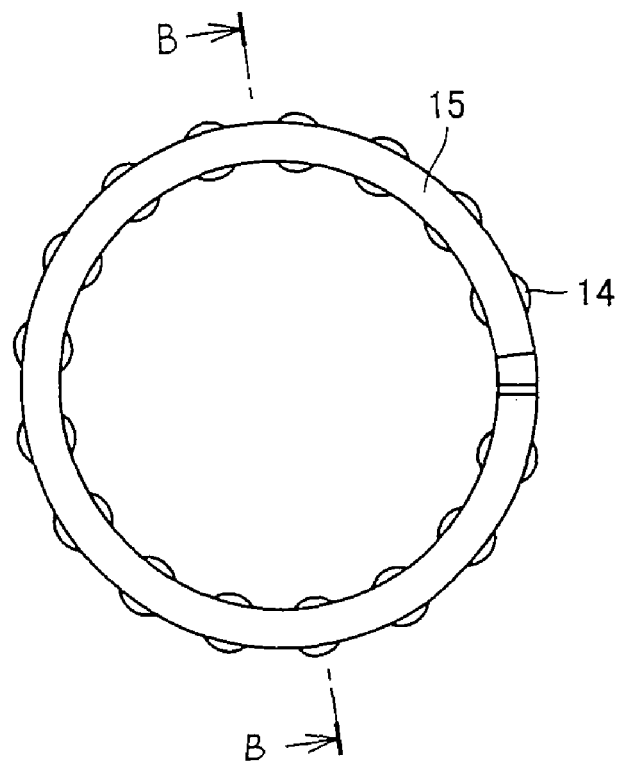
FIG. 6A is a view showing a cage holding rollers.
Figure 6B:
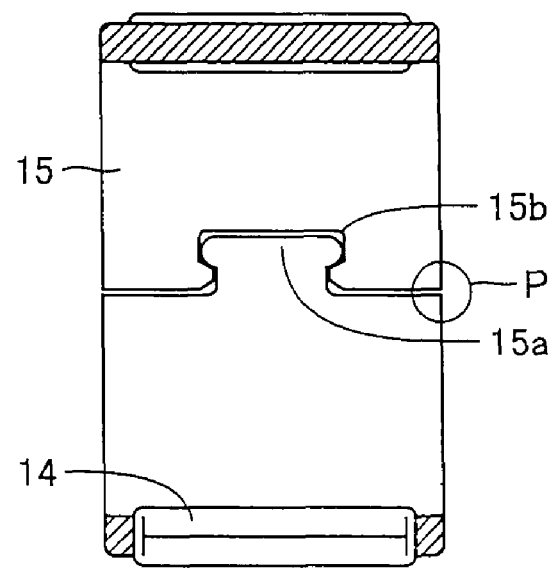
FIG. 6B is a sectional view taken along line B-B in FIG. 6A.

The cage 15 is formed of a resin material and has a plurality of pockets to house the needle rollers 14 in the circumferential direction as shown in FIG. 6A. In addition, as shown in FIG. 6B, the cage 15 is cut at one circumferential part in the axial direction. The cage 15 is elastically deformed to be set in a shaft and then a convex part 15a engages with a concave part 15b at the cut part.

According to the needle roller bearing 11 having the above constitution, since a part of the outer ring 13 and a part of the cage 15 are cut, it can be used as a bearing for a crankshaft, a camshaft, a rocker shaft and the like of a car in which assembling cannot be implemented in the axial direction.

In addition, the projection 12a is provided in the outer ring member 12 to prevent the outer ring 13 from rotating in the circumferential direction, and the engaging click 12b is provided to prevent the cage 15 from moving in the axial direction.

Here, the outer ring member 12 comprises a middle region 12d in the center in the circumferential direction, which becomes the load region when the bearing is used, and end regions 12e at both ends in the circumferential direction, which become non-load regions when the bearing is used. The projection 12a and the engaging click 12b are positioned at the opposite end regions 12e across the middle region 12d, respectively.

For example, when the projection 12a is formed from the side of an inner diameter surface of the outer ring member 12 by a burring process, the recessed part is formed in its orbit surface and the surface is not flat, so that the movement of the needle roller becomes unstable when it passes on the recessed part. In addition, the engaging part of the cage 15 could be caught by a side surface of the engaging click 12b. Therefore, when the projection 12a or the engaging click 12b is positioned on the load region, smooth rotation of the bearing could be hindered, which causes a trouble such as a rotation defect of the needle roller.

Thus, the projection 12a and the engaging click 12b are provided in the end region which is the non-load region to avoid such trouble. In addition, although the projection 12a and the engaging click 12b may be formed on the same end region, when they are provided at the opposite end regions 12e across the middle region 12d, the projection 12a, the engaging click 12b and the outer ring member 12 are easily processed, respectively.

Furthermore, in the case where the outer ring 13 comprises the two outer ring members 12, when it is assumed that a center angle is φ from an outermost end of the outer ring member 12 in the circumferential direction, the end region 12e is positioned within a range of 5°≦φ45°. In order to provide the middle region 12d of the load region as large as possible, the center angle of the end region 12e of the non-load region has to be set within 45° from the outermost end of the outer ring member 12. Meanwhile, when each of the projection 12a and the engaging click 12b positioned in the end region 12e is too close to the outermost end 12c of the outer ring member 12 in the circumferential direction, they are affected by curving stress when the plate-shaped outer ring member 12 is curved into an arc shape, so that the center angle of them from the circumferential outermost end 12c toward the middle region 12d is to be 5° or more.

Although the outer ring 13 comprises two outer ring members 12 split in the diameter direction in the above embodiment, the present invention is not limited to this and it may be split into any number.

Although each of the projection 12a and the engaging click 12b is provided at one position in each outer ring member 12 in the above embodiment, the present invention is not limited to this and each of them may be provided at one position in the entire outer ring 13 or may be provided at a plurality of positions in each outer ring member 12.

In addition, although the engaging click 12b is provided at a part of the axial end the outer ring member 12 in the above embodiment, an engaging click 12b may be provided over the entire axial end of the outer ring member 12. In this case, since the cage 15 is not caught by a side face of the engaging click 12b, even when the engaging click 12b is positioned in the load region, a rotation defect and the like are not generated.

Furthermore, the cage 15 may be formed by pressing a metal material instead of being formed of the resin, or the cage 15 may not be provided.

As a preferred embodiment, a preferred size of the projection 12a serving as the positioning engaging part formed in the outer ring member 12 will be described with reference to FIGS. 7A to 10.

Since the projection 12a is formed in the outer ring member 12 by a burring process, for example, a hole 12c piercing the inner diameter surface from the outer diameter surface is formed in its center. In case that this hole 12c is too large, the movement of the needle roller 14 becomes unstable when it passes on the hole 12c, which causes vibration or noise and could cause a damage of the needle roller bearing 11 at an early stage.

Figure 7A:
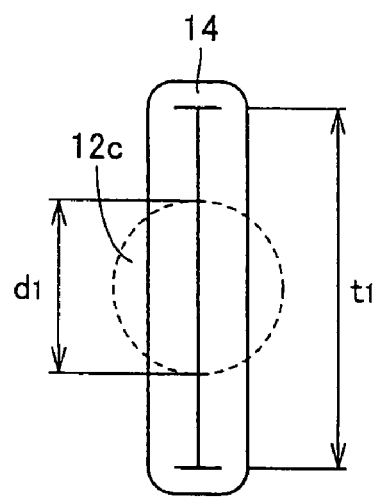
FIG. 7A is a view showing a needle roller.
Figure 7B:
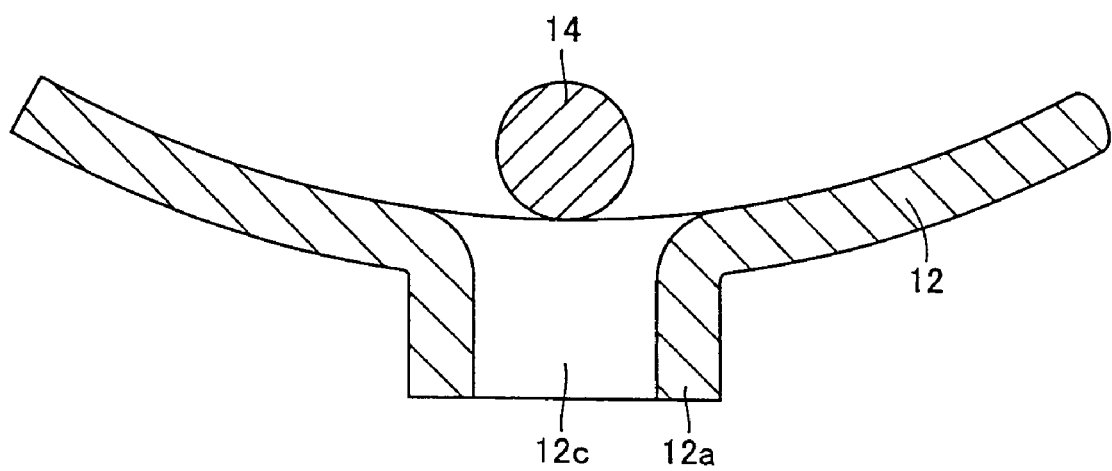
FIG. 7B is a view showing a relation between a hole and the needle roller provided at a positioning engaging part.

Therefore, a diameter $d_1$ of the hole 12c and an effective length $t_1$ of the needle roller 14 is set such that $d_1/t_1 < 0.5$ as shown in FIGS. 7A and 7B. Thus, since 50% or more of the effective length of the needle roller 14 is in contact with the orbit surface of the outer ring 13 even on the hole 12c, the movement of the needle roller 14 can be stable when it passes on the hole 12c. As a result, the needle roller bearing 11 can maintain the smooth rotation of the needle roller 14.

Figure 8A:
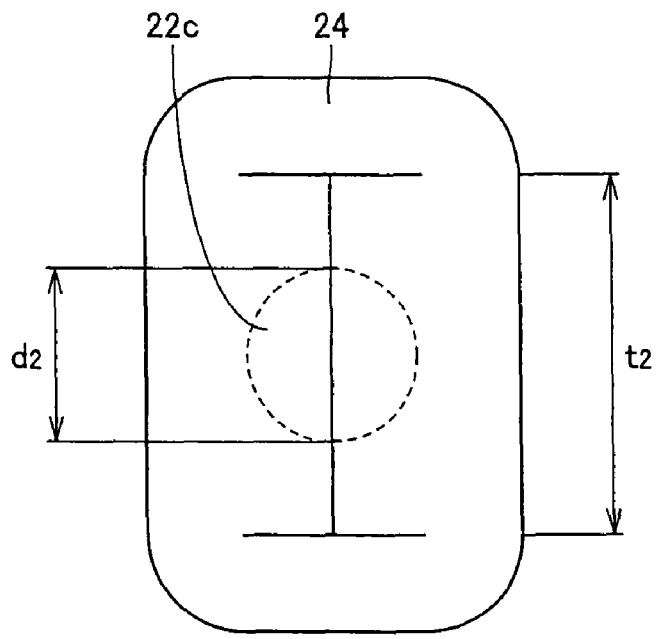
FIG. 8A is a view showing a needle roller.
Figure 8B:
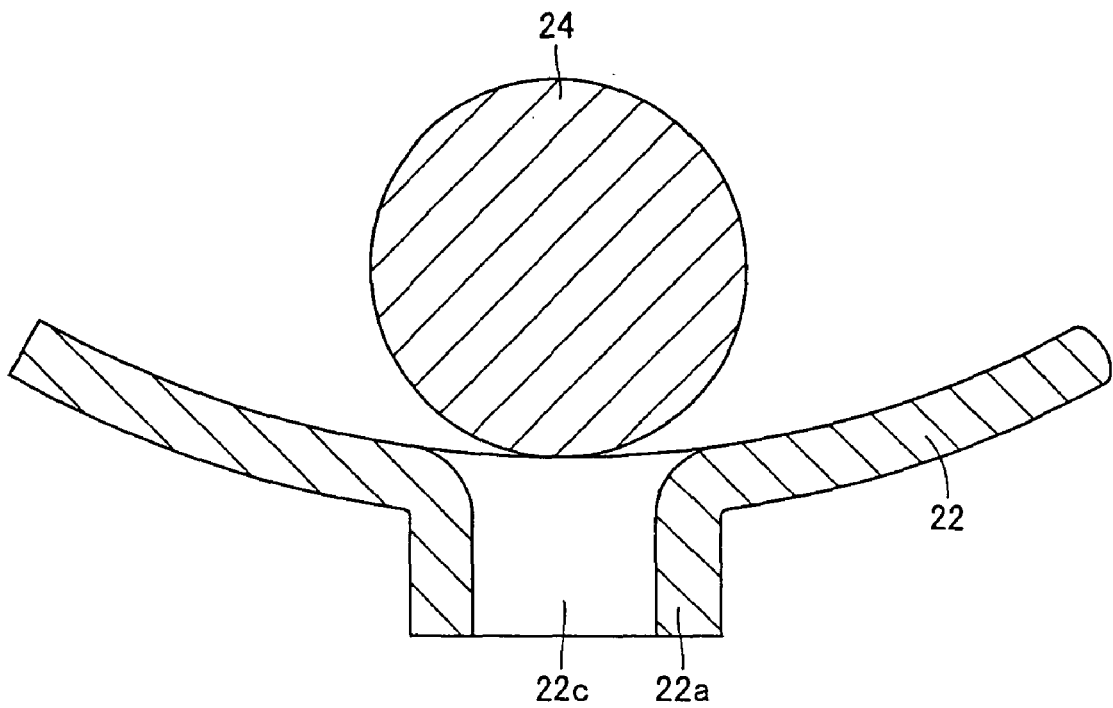
FIG. 8B is a view showing a relation between a hole and the needle roller provided at a positioning engaging part.

In addition, although the diameter $d_1$ of the hole 12c is larger than the roller diameter of the needle roller 14 in the above embodiment, the present invention is not limited to this, and even when a $d_2$ of a hole 22c is smaller than a diameter of a needle roller 24, the same effect can be expected as long as the relation such as $d_2/t_2 < 0.5$ is satisfied as shown in FIGS. 8A and 8B.

Figure 9A:
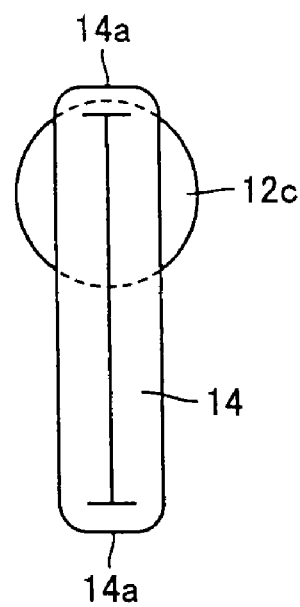
FIG. 9A is a view showing a needle roller.
Figure 9B:
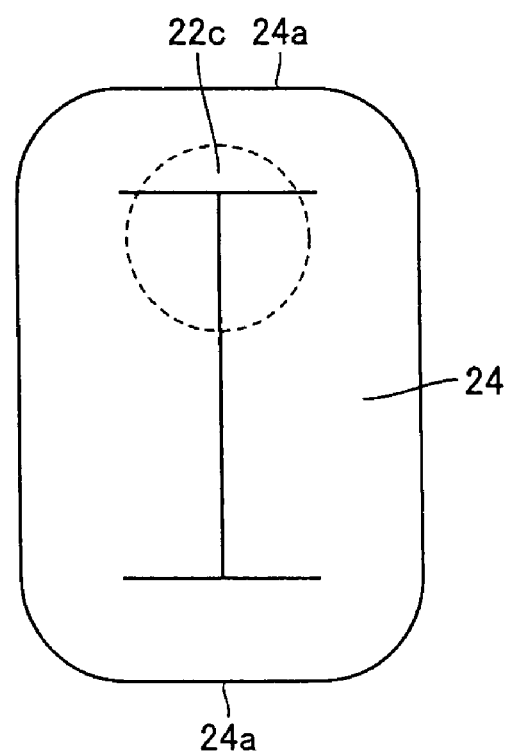
FIG. 9B is a view showing a needle roller.

Furthermore, the holes 12c and 22c are not necessarily positioned in the center of the length of the needle rollers 14 and 24, respectively, so that they may be shifted from the center of the roller length as shown in FIGS. 9A and 9B.

However, when ends 14a and 24a of the needle rollers 14 and 24 are positioned on the holes 12c and 22c, respectively, even if the holes 12c and 22c are small, the movements of the needle rollers 14 and 24 become unstable on the holes 12c and 22c, respectively. Thus, the holes 12c and 22c are to be positioned such that the ends 14a and 24a of the needle rollers are not positioned thereon, respectively to solve the above problem.

Figure 10:
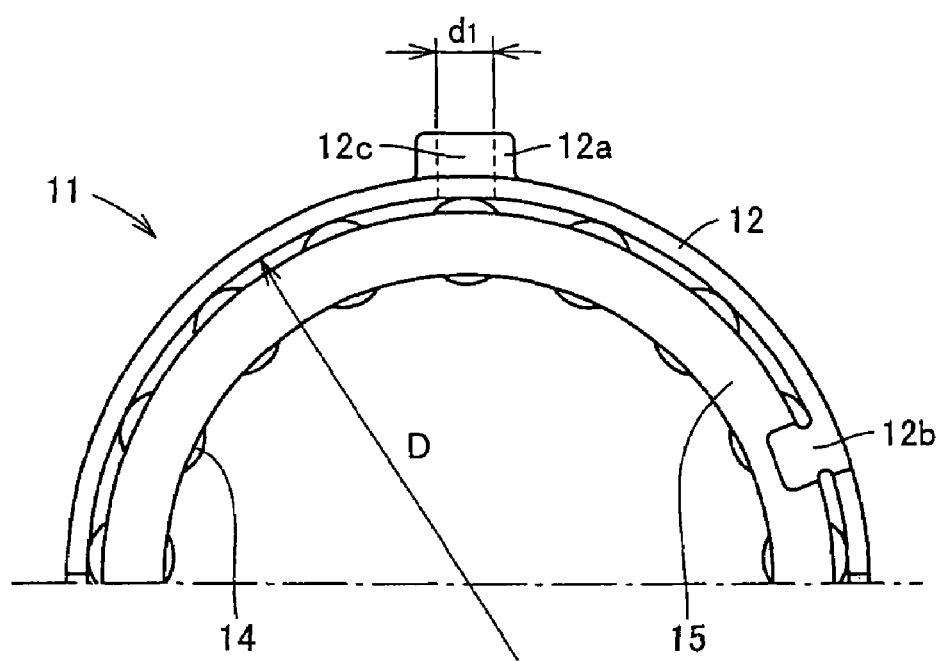
FIG. 10 is a view showing a relation between a hole and the needle roller provided at the positioning engaging part.

Furthermore, as shown in FIG. 10, the diameter $d_1$ of the hole 12c and an inner diameter D of the outer ring member 12 are set such that $d_1/D < 0.2$. When it exceeds this range, a ratio of the hole 12c to the inner diameter of the outer ring member 12 becomes too high, causing vibration or noise and a damage of the needle roller bearing 11 at an early stage.

In order to confirm the effect of the present invention, a test was performed such that a hole having a predetermined size was formed in the outer ring of the needle roller bearing and the bearing is rotated with radial load applied to measure a bearing life. Test conditions are shown below.

Its result is as shown in a table 1.

Hole diameter: φ 3, φ 5, φ 6 (mm)
Radial load: 5000 (N)
Rotation speed: 3000 (rpm)

TABLE 1

Relation between hole diameter and bearing life

| hole diameter | axial position of hole | d/t. (d: hole diameter, t: effective length of roller) | life ratio of the result ($L_{50}$) |
|---|---|---|---|
| No hole | — | 0 | — |
| φ 3 | center | 31% | 1 |
|  | edge |  | 1 |
| φ 5 | center | 51% | 1 |
|  | edge |  | 1 |
| φ 6 | center | 61% | 0.3 |
|  | edge |  | 0.3 |

The table 1 shows a life ratio ($L_{50}$) of the result based on a bearing having no hole. According to the table 1, when the diameter of the hole is not more than 50% of the effective length, the bearing life is not lowered. In addition, although tests were performed when the hole was arranged in the center of the roller length, and when it is arranged at a position shifted from the center, their results are the same. Thus, the effect of the present invention has been confirmed.

Figure 11A:
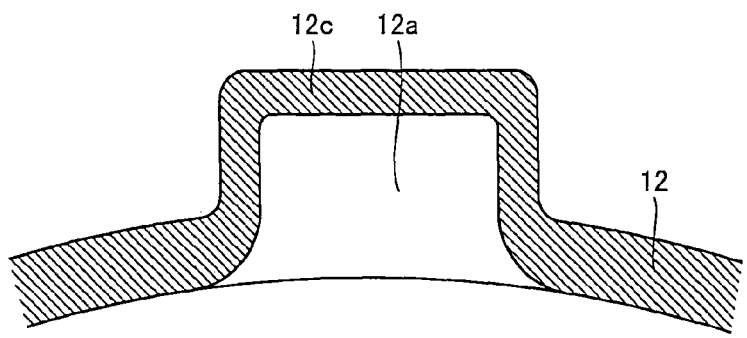
FIG. 11A is a sectional view showing a positioning projection part according to another embodiment of the present invention.

Another embodiment of the present invention will be described with reference to FIGS. 11A to 12. Since the needle roller bearing 11 having the above constitution is used under high-load circumstances in many cases, great hardness is required for the positioning projection 12a also. Thus, according to the preferred embodiment, the positioning projection 12a has a top wall 12c at its end as shown in FIG. 11A. Thus, sufficient hardness can be provided under the high-load circumstances.

Figure 11B:
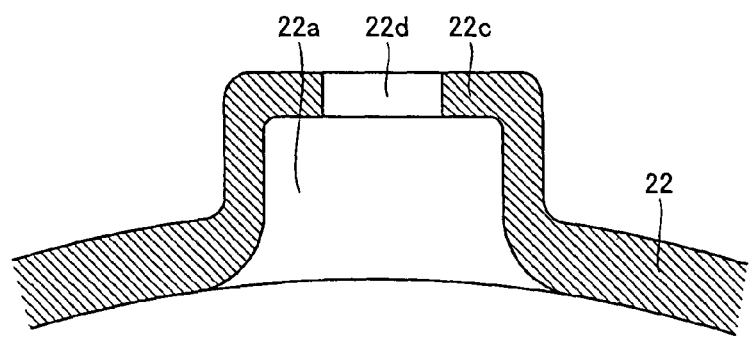
FIG. 11B is a sectional view showing a positioning projection part according to still another embodiment of the present invention.

In addition, as still another embodiment, an oil hole 22d may be provided at a top wall 22c of a positioning projection 22a as shown in FIG. 11B. Thus, since lubrication oil can be effectively supplied to a rolling surface of a needle roller, a needle roller bearing can provide excellent lubricating ability.

Figure 12:
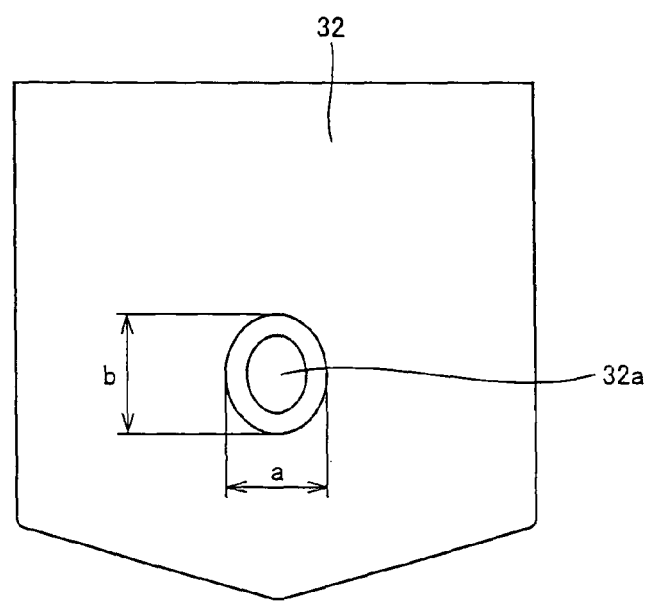
FIG. 12 is a sectional view showing a positioning projection part according to still another embodiment of the present invention.

Furthermore, as another method to ensure the hardness, as shown in FIG. 12, a positioning projection 32a may have an oval section in which it is long in the circumferential direction of the outer ring member 32, that is, a <b. Torque is applied to the outer ring member 32 in the circumferential direction due to rolling friction generated when the needle roller 14 rolls. Thus, when the positioning projection 32a has the oval section in which it is long in the direction to which the load is applied, the hardness of the positioning projection 32a can be enhanced. In this case, since sufficient hardness can be ensured under the high-load circumstances, the end of the positioning projection 32a may be open or have a top wall.

INDUSTRIAL APPLICABILITY

The present invention is advantageously applied to a needle roller bearing which supports a crankshaft, a camshaft, a balance shaft, and a rocker shaft in a car.

Although the embodiments of the present invention have been described with reference to the drawings in the above, the present invention is not limited to the above-illustrated embodiments. Various kinds of modifications and variations may be added to the illustrated embodiments within the same or equal scope of the present invention. Furthermore, characteristics of each embodiment can be arbitrarily combined.

What is claimed is:
1. A needle roller bearing comprising:
an outer ring having a plurality of outer ring members split by split lines extending in an axial direction of the bearing; and a plurality of needle rollers arranged on an orbit surface of said outer ring so that the needle rollers can roll thereon, a cage holding said plurality of needle rollers at intervals, wherein said outer ring member has a positioning engaging part engaging with a housing for positioning, at a position shifted from a circumferential center of the housing, wherein said outer ring member has a middle region positioned between end regions of the outer ring member, the middle region acting as a load region while the bearing is used, and the end regions acting as non-load regions while the bearing is used, wherein said outer ring member has an engaging click protruding inward along a diameter at a width-direction end of the outer ring member to prevent said cage from moving in an axial direction, and said engaging click is positioned in at least one of said end regions and has circumferentially opposed and radially extending edges, and said positioning engaging part is positioned in at least one of said end regions, wherein said positioning engaging part and the engaging click are positioned in opposing end regions.

2. The needle roller bearing according to claim 1, wherein the outer ring comprises said two outer ring members, and when a center angle from an outermost end of the outer ring member in the circumferential direction is cp, said end region is positioned within a range $5° \leq \phi \leq 45°$.

3. The needle roller bearing according to claim 1, wherein the positioning engaging part has a hole provided in said outer ring member, wherein a diameter "d" of said hole and an effective length "t" of said needle roller has a relation such that $d/t < 0.5$.

4. The needle roller bearing according to claim 1, wherein said hole is arranged so that an end of said needle roller does not pass thereon.

5. The needle roller bearing according to claim 3, wherein the diameter "d" of said hole and an inner diameter D of said outer ring member has a relation such that $d/D < 0.2$.

6. The needle roller bearing according to claim 1, wherein said positioning engaging part has a configuration in which, during bearing use, a portion facing in one direction to which the load is applied has a hardness that is higher than that of another portion facing another direction.

7. The needle roller bearing according to claim 6, wherein the positioning engaging part protruding toward an outer diameter surface of said outer ring member has a top wall.

8. The needle roller bearing according to claim 7, wherein said top wall has an oil hole.

9. The needle roller bearing according to claim 1, wherein said positioning engaging part has an oval section in which it is long in a circumferential direction of said outer ring member.

* * * * *